United States Patent
Takeda

[11] 3,719,207
[45] March 6, 1973

[54] APPARATUS FOR TRANSPORTING FLUID

[75] Inventor: Hideo Takeda, Kanagawa, Japan

[73] Assignee: Fuji Photo Film Co., Ltd., Kanagawa, Japan

[22] Filed: Nov. 13, 1970

[21] Appl. No.: 89,219

[30] Foreign Application Priority Data

Nov. 13, 1969   Japan..............................44/90897

[52] U.S. Cl. ......................137/604, 302/30, 302/64
[51] Int. Cl............................................F16k 19/00
[58] Field of Search ........137/13, 604; 138/154, 177, 138/178, DIG. 11; 239/400, 402, 403; 259/4; 302/30, 46, 64

[56] References Cited

UNITED STATES PATENTS

| | | | |
|---|---|---|---|
| 1,954,173 | 4/1934 | Histed | 239/400 |
| 3,226,036 | 12/1965 | Grahn | 239/400 |
| 2,661,194 | 12/1953 | Katovsich | 259/4 X |
| 1,007,788 | 11/1911 | Mills | 137/13 |
| 1,262,351 | 4/1918 | Jones et al. | 239/400 |
| 998,762 | 7/1911 | Faller | 239/403 UX |
| 2,095,242 | 10/1937 | Dick | 239/400 |

FOREIGN PATENTS OR APPLICATIONS

| | | | |
|---|---|---|---|
| 131,175 | 8/1919 | Great Britain | 239/402 |

Primary Examiner—Robert G. Nilson
Attorney—Sughrue, Rothwell, Mion, Zinn & Macpeak

[57] ABSTRACT

A method of and apparatus for transporting fluid wherein the fluid is transported through a pipe having a helical protrusion on the internal surface thereof which causes the fluid in the pipe to rotate about the longitudinal axis of the pipe.

6 Claims, 20 Drawing Figures

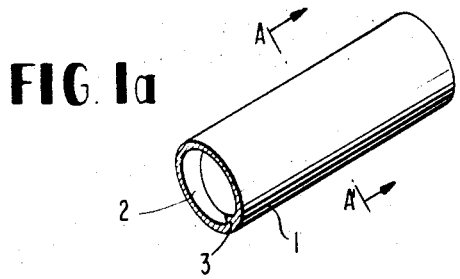
FIG. 1a
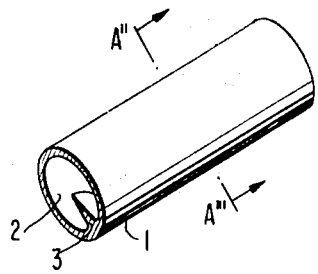
FIG. 1b
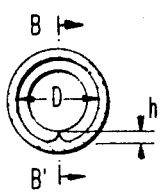
FIG. 2a
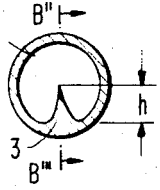
FIG. 2b
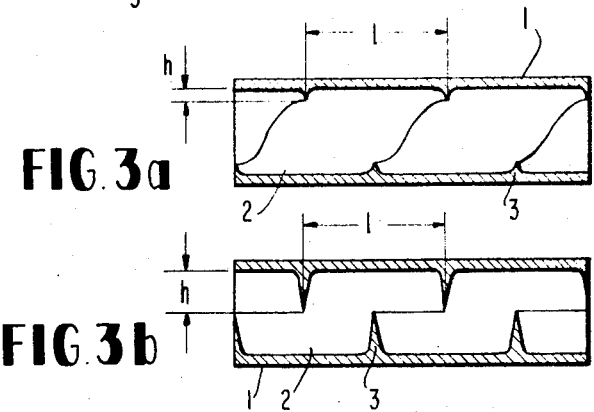
FIG. 3a
FIG. 3b
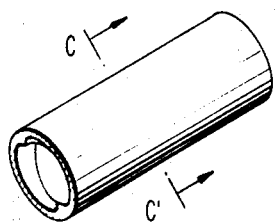
FIG. 4a
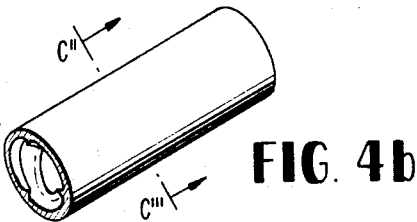
FIG. 4b
FIG. 5a
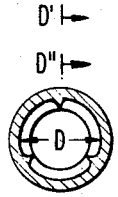
FIG. 5b
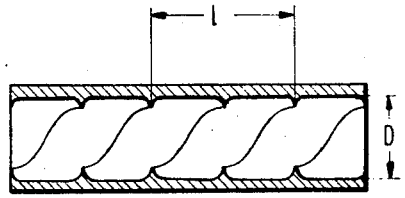
FIG. 6a
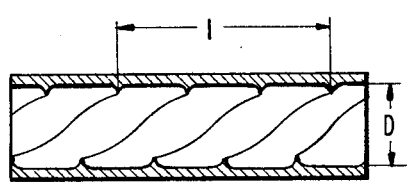
FIG. 6b
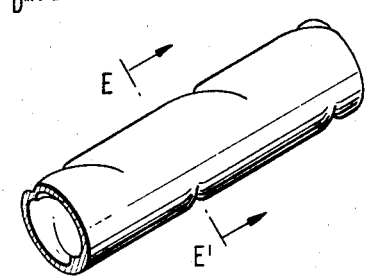
FIG. 7
INVENTOR
HIDEO TAKEDA

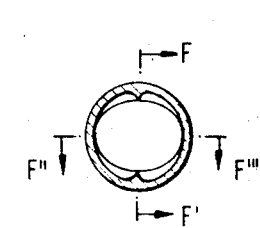
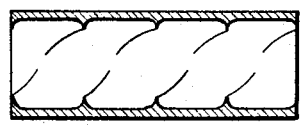
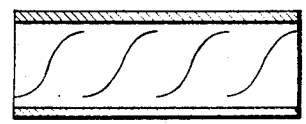
FIG. 8    FIG. 9a    FIG. 9b
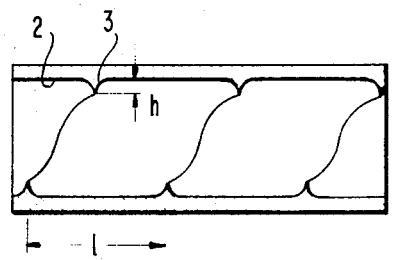
FIG. 10
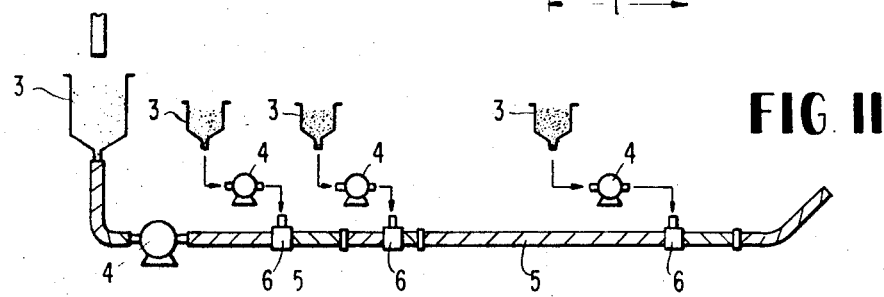
FIG. 11
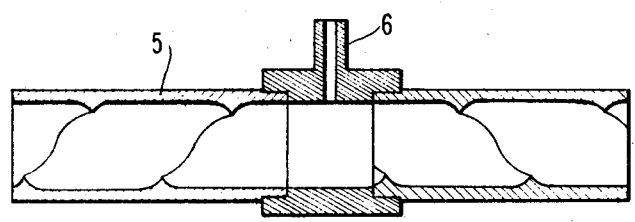
FIG. 12
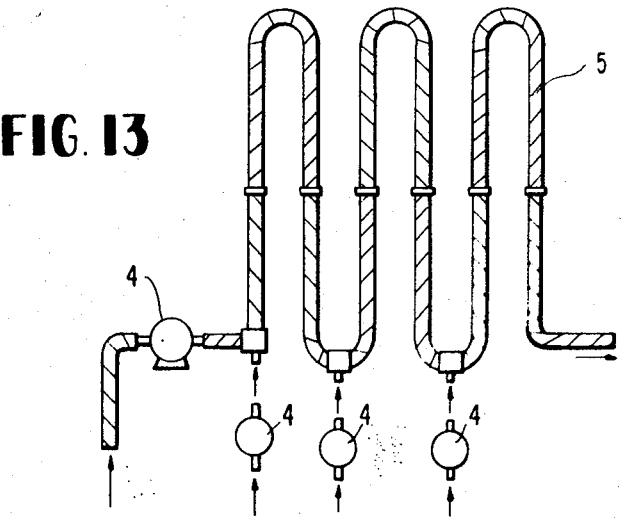
FIG. 13

APPARATUS FOR TRANSPORTING FLUID

BACKGROUND OF THE INVENTION

This invention relates to a method of transporting fluid such as liquid, gas, a mixture of liquid and gas, a mixture of solid and gas, a mixture of solid and liquid or the like, in uniformly mixed state, and also relates to an apparatus for the carrying out the above method.

In the convention method of and apparatus for transporting fluid through a pipe, there have been various disadvantages such as precipitate accumulating on the internal surface of the pipe and air bubbles gathering in the pipe at the upper portion thereof. Accordingly, it takes a long time to clean the internal surface of the pipe, and it takes a fairly long time to attain a homogeneous mixture property in the transport pipe. Particularly, at the time of transporting fluid at a low speed, i.e., below Reynolds number 2,300 the above described disadvantages become considerable. In the prior art, it has been required to make the flow velocity high to eliminate the above described disadvantages, and this has resulted in an unnecessarily large flow rate or a large loss of pressure.

SUMMARY OF THE INVENTION

In light of the above description of the prior art, it is a primary object of the present invention to provide a method of transporting fluid through a pipe in which no precipitate accumulates.

Other objects of the present invention are to provide an apparatus for transporting fluid with efficient mixing and chemical reaction even at a low speed.

A further object of the present invention is to provide a method of and apparatus for transporting fluid without causing bubbles to accumulate at the upper portion of the transporting pipe.

The present invention furnishes a method of transporting fluid in a pipe (which is called "helical pipe" hereinafter), with a rotational flow along the protrusions of a helical configuration on the internal surface of the pipe and apparatus consisting of helical pipes and auxiliary pieces of equipment.

Other objects, features and advantages of the invention will be made apparent from the following description of the preferred embodiments thereof taken in conjunction with the accompanying drawings.

BRIEF DESCRIPTION OF THE DRAWINGS

FIGS. 1a and 1b are perspective views showing a part of the pipe for transporting fluid in accordance with the present invention, in which FIG. 1a shows one embodiment thereof and FIG. 1b shows another embodiment;

FIGS. 2a and 2b are cross-sectional views taken substantially along line A—A' in FIG. 1a, line A"—A'" in FIG. 1b, respectively;

FIGS. 3a and 3b are longitudinal sectional views of the pipes shown in FIGS. 1a and 1b, and 2a and 2b, taken substantially along line B—B' in FIG. 2a and line B"—B'" in FIG. 2b, respectively;

FIGS. 4a and 4b are perspective views showing modified embodiments of the pipe in accordance with the invention which have a plurality of protrusions on the internal surface thereof;

FIGS. 5a and 5b are cross sectional views of the pipes shown in FIGS. 4a and 4b taken substantially along the lines C—C' and C'—C'" respectively;

FIGS. 6a and 6b are longitudinal sectional views of the pipes shown in FIGS. 4a and 4b, and 5a and 5b, taken substantially along lines D—D' and D"—D'" in FIGS. 5a and 5b, respectively;

FIG. 7 is a perspective view showing a further embodiment of the pipe according to the invention;

FIG. 8 is a cross sectional view of the pipe shown in FIG. 7 taken substantially along line E—E' of FIG. 7;

FIGS. 9a and 9b are longitudinal sectional views of the pipe shown in FIGS. 7 and 8, taken substantially along the line F—F' and line F'—F'" in FIG. 8, respectively;

FIG. 10 is an enlarged sectional view of a pipe of the type shown in the above figures showing the dimensions of the protrusions provided on the internal surface of the pipe;

FIG. 11 is a schematic view of the whole arrangement of the transporting apparatus in accordance with the present invention;

FIG. 12 is an enlarged detail view of a portion of the apparatus shown in FIG. 11, and FIG. 13 is a schematic view of an arrangement of the transporting apparatus in accordance with a further embodiment of the present invention.

DESCRIPTION OF THE PREFERRED EMBODIMENTS

Now referring to the drawings, the helical pipe employed in the apparatus and method of the present invention will be described in detail.

In FIGS. 1 to 3 the reference numeral 1 indicates a helical pipe employed in the present invention, 2 indicates the internal surface of the helical pipe 1, and 3 indicates a rib-like protrusion provided on the internal surface of the pipe along a helical line thereon.

FIGS. 4a through 6b show other embodiments of the pipe employed in the present invention which are provided with a plurality of protrusions on the internal surface thereof.

In FIGS. 7 and 9 are shown another embodiment of the pipe of the invention which is provided with helical protrusions at intervals.

The number of the rib-like protrusions 3 on the internal surface 2 of the pipe employed in accordance with the invention is not limited to one. but may be a plurality. Also, the protrusions are not limited to continuous ones, but may be broken ones or be provided at intervals as shown in accordance with the embodiment shown in FIGS. 7 to 9. Further, the direction of a helical curve on the internal surface of the pipe may be varied. The purpose of the provision of the rib-lie protrusions 3 on the internal surface of the helical pipe along a helical line thereon is the effect of transporting the fluid therein by rotating it along the protrusion.

The rib-like protrusions 3 are illustrated in FIG. 10, and will be described in detail herein below. As shown in FIG. 10, the height of each of the protrusions 3 is ($h$) and the pitch of the helical protrusion is ($l$). The height ($h$) and pitch ($l$) are required to have definite values with respect to the internal diameter D of the pipe, since the protrusions 3 are provided for causing the fluid flow to rotate in the pipe. Accordingly, the pitch ($l$) preferably is larger than one half of the internal diameter D of the pipe. The height ($h$) preferably is larger than 1/6 and smaller than ½ of the internal diameter D of the pipe. And the protrusions preferably have symmetrical streamlined faces on the internal surface of the pipe.

In FIGS. 11 to 13, the reference numerals 3, 3 ... indicate storage tanks, 4, 4 ... indicate pumps, 5, 5 ... indicate helical pipes, and 6, 6 ... indicated feeding points. The solution in storage tanks 3, 3 ... is introduced into the helical pipe 5 at the feeding points 6, 6 ... through the pumps 4, 4 ...

Liquids introduced into the helical pipe flow therethrough with rotation about the longitudinal axis thereof and are well mixed with other fluids in the pipe introduced from other tanks.

In accordance with the transporting method of the present invention, various advantages are obtained due to the high velocity of fluid flow therein and stirring effect therein effected by the helical protrusions on the internal surface of the pipe. First, there is no precipitate accumulation on the internal surface of the pipe. Second, the formation of the bubbles in the pipe due to the slow flow of the fluid through the pipe is eliminated. Third, the mixing effect is accelerated since the whole fluid rotates about the axis of the pipe three-dimensionally when flowing therethrough. Fourth, there is little longitudinal dispersion of fluid in the pipe and each portion of the fluid reaches the end of the pipe in the order in which each portion has been sent therein, that is, the fluid flows through the pipe under a so-called piston-flow condition.

Now the method and apparatus in accordance with the present invention will be described with reference to the experimental results in comparison with a conventional method and apparatus.

Experiment 1

Comparison of the amount of the precipitate in a cylindrical pipe with that in a helical pipe according to the invention The suspension of gelatin solution of 10CP viscosity containing silver halide particles with average size 2 $\mu$ was run through a cylindrical pipe and a helical pipe connected with the former. The above pipes connected in series were horizontally set and the suspension was run therethrough at the flow rate of 3 liter/min. Both pipes had length of L=1.5m and internal diameter of D=16mm. The helical pipe as shown in FIG. 1 was provided with a protrusion having a height of $h$=2.5mm and pitch of l =about 50mm. Only one helical protrusion was provided on the internal surface of the helical pipe used. The amount of the precipitate of the silver halide accumulated on the internal surface of the both pipes in one hour was measured. The measured precipitate was about 10gr. in the cylindrical pipe and about 1gr. in the helical pipe. It will be noted that the precipitate in the helical pipe in accordance with the present invention is much less than that in the conventional one.

Experiment 2

Comparison of the mixing effect by the helical cylindrical pipe with that by a helical pipe in accordance with the present invention An aqueous gelatin solution of 5 percent (about 5cp viscosity) was run through a cylindrical pipe having diameter of D=10mm and through a connected helical pipe assembly having the same diameter. The connected helical pipe assembly was composed of a couple of helical pipes having the same height of protrusion ($h$=about 2mm) and the same pitch thereof ($l$ =about 12mm), but with opposite helical directions, and a feeding nozzle interposed therebetween as shown in FIGS. 11 and 12. The aqueous gelatin solution flowed therethrough at the flow rate of 500cc/min and methyl alcohol was added thereinto through a 4mm orifice, which was used to observe particularly the mixing effect therein. According to the observations, in the case of the conventional cylindrical pipe, turbid liquid, which is usually produced when the mixing of gelatin solution with methyl alcohol is insufficient, was formed as a layer separated from a clear part of the solution in the pipe and flowed through the pipe. In the vicinity of the nozzle, white gum-like lumped material was produced. On the other hand, in the case of the helical pipe in accordance with the invention, the turbid liquid was seen only near the adding nozzle (from 5 to 6cm from the nozzle) and further downstream from the nozzle the solution was completely mixed and become transparent. In the latter case, the turbid liquid observed near the nozzle was seen rotating along the helical protrusion in the pipe. As described above, the mixing effect was much different in the conventional pipe from that in the helical pipe. As apparently understood, the mixing effect in the helical pipe according to the invention was much greater than the effect in the conventional pipe.

Experiment 3

Comparison of the ratio of the maximum and the minimum residence time (Tmin/Tmax) in a cylindrical pipe with that in a helical pipe according to the invention A conventional cylindrical pipe having a diameter of D=16mm and length of L=4mm and a helical pipe as shown in FIG. 1 having the same diameter and length provided with a protrusion having height of 2.5mm and pitch of $l$=50mm were used. A finite amount of tracer with a low diffusibility was instantaneously introduced from the inlet of the pipe so that the fluid inside the pipe had a uniform initial concentration of the tracer in a plane perpendicular to the longitudinal direction and the concentration of the tracer at the outlet of each pipe was detected. The time when the tracer began to come out and the time when the tracer finished coming out were measured. They correspond with the minimum residence time (Tmin) and the maximum residence time (Tmax) respectively. The residence-time ratios (Tmin/Tmax) were as follows. The specific gravity of liquid used was about 1.

| condition of feeding fluid | flow rate l/min. | 3 | 5 | 1 | 1.5 | 3 | 5 |
|---|---|---|---|---|---|---|---|
| | viscosity cp | 15 | 15 | 1 | 1 | 1 | 1 |
| Tmin/Tmax | cylindrical pipe | 0.07 | 0.07 | 0.12 | 0.15 | 0.32 | 0.42 |
| | helical pipe | 0.20 | 0.29 | 0.44 | 0.51 | 0.61 | 0.67 |

As clearly shown in the above table, the residence-time ratios (Tmin/Tmax) for the helical pipe of the invention can be made much larger than that for the conventional cylindrical pipe, which means that the pipe according to the invention can transport the fluid in the so-called piston-flow condition.

What is claimed is:

1. A pipe for transporting fluid with rotational flow, minimizing precipitate on an internal surface of the pipe, minimizing accumulation of gas bubbles in the upper portion of the pipe, while accelerating mixing of the fluid and promoting a piston flow condition, the pipe comprising:
   a. a cylindrical tubular pipe of constant internal diameter having an inner surface and an outer surface,
   b. a rib-like protrusion of constant section throughout its length extending inwardly from the inner surface of the pipe and positioned along a helix on the inner surface of the pipe,
   c. the pitch of the helix being greater than one-half the internal diameter of the pipe,
   d. the height of the rib-like protrusion being the same along the length of the helix and between one-sixth and one-half the internal diameter of the pipe,
   e. the protrusion having streamlined symmetrical side surfaces merging smoothly into the internal surface of the pipe, and
   f. the innermost tip of the protrusion being sharp and pointed in section.

2. A pipe as defined in claim 1 wherein there are at least two rib-type protrusions positioned along a corresponding number of helices.

3. A pipe as defined in claim 2 wherein the helices are positioned along the same length of the pipe.

4. A pipe as defined in claim 2 wherein the helices are in series along a length of pipe.

5. A pipe as defined in claim 2 wherein the helices extend in opposite directions in different sections of the pipe.

6. A pipe as defined in claim 1 further comprising means for introducing fluid laterally into the pipe to mix with fluid flowing longitudinally through the pipe.

* * * * *